Oct. 16, 1945.                J. R. SNYDER                 2,386,754
                             UNIVERSAL JOINT
                           Filed Feb. 5, 1942            2 Sheets-Sheet 1

INVENTOR.
JACOB RUSH SNYDER
BY Kurs Hudson & Kent
ATTORNEYS

Oct. 16, 1945.  J. R. SNYDER  2,386,754
UNIVERSAL JOINT
Filed Feb. 5, 1942  2 Sheets-Sheet 2

INVENTOR.
JACOB RUSH SNYDER
BY Kwis Hudson & Kent
ATTORNEYS

Patented Oct. 16, 1945

2,386,754

UNITED STATES PATENT OFFICE 2,386,754

UNIVERSAL JOINT

Jacob Rush Snyder, Cleveland, Ohio, assignor to Thompson Products, Inc., Cleveland, Ohio, a corporation of Ohio Application February 5, 1942, Serial No. 429,671

12 Claims. (Cl. 64—8)

This invention relates to torque-transmitting universal joints and, as one of its objects, aims to provide an improved universal joint embodying a resilient medium capable of absorbing vibrations and shocks so as to prevent such vibrations and shocks from being transmitted with the torque.

Another object of my invention is to provide an improved universal joint of this character in which the resilient medium is arranged to permit relative floating of one of the joint members.

Still another object of my invention is to provide an improved universal joint of this character in which bearing means supporting one of the joint members permits relative rocking thereof and the resilient medium cooperates with such joint member so as to cushion said relative rocking and absorb vibrations and shocks from the torque being transmitted.

A further object of my invention is to provide an improved universal joint of the character mentioned which will be well suited for transmitting torque to the propeller shaft of a motor vehicle and in which the end movement and change of angle of the propeller shaft will be readily accommodated without need for a slip-spline connection and without causing twisting or stretching of the resilient cushioning and vibration-absorbing medium.

It is also an object of this invention to provide an improved universal joint of the kind having a roller-carrying joint member which is rockable and slidable in a second joint member to accommodate angularity of a torque-transmitting shaft, and wherein a resilient medium embodied in the universal joint cushions and absorbs shocks and blows so as to prevent the rollers from peening or otherwise damaging the bearing surfaces with which they cooperate.

Yet another object of my invention is to provide an improved universal joint containing a quantity of loose, dry powder for lubricating its bearing surfaces and moving parts.

The invention may be further briefly summarized as consisting in certain novel combinations and arrangements of parts hereinafter described and particularly set out in the appended claims.

Further and more detailed reference will now be made to the drawings for the purpose of describing the construction and operation of the illustrated embodiments of my invention, but before proceeding with the detailed description, it should be understood that the invention is not limited to the particular universal joints illustrated, but may be embodied in various other universal joint structures.

Figure 1:
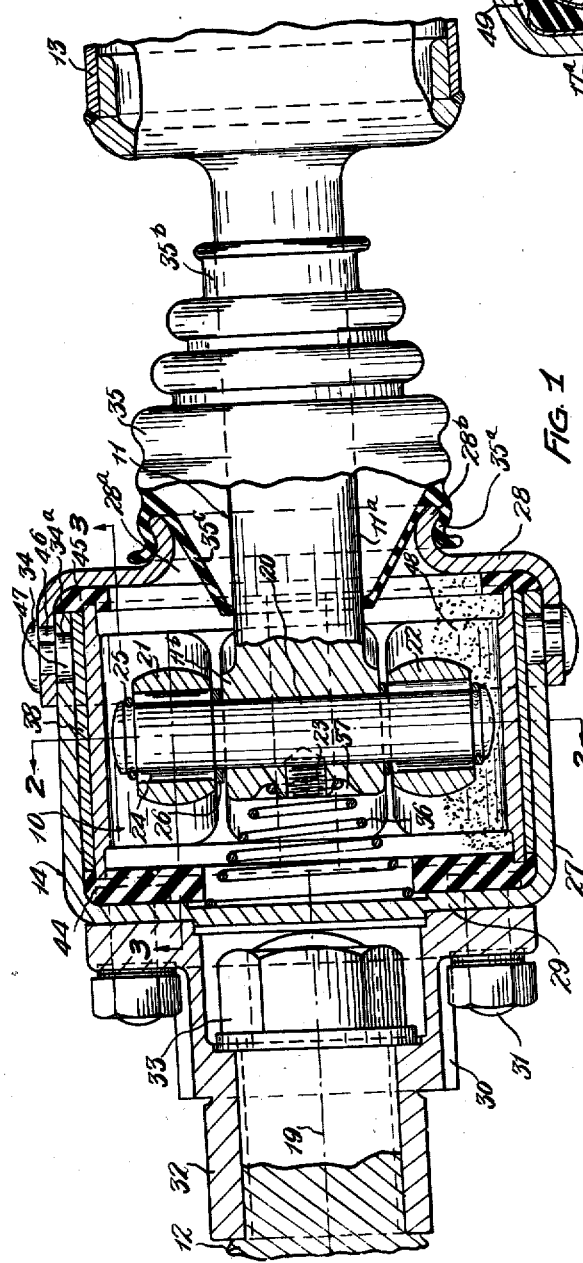
Fig. 1 is a longitudinal sectional view taken through a universal joint embodying my invention.
Figure 4:
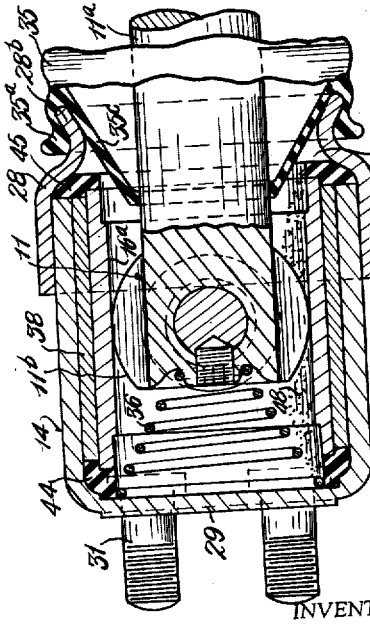
Fig. 4 is another partial longitudinal sectional view taken on line 4—4 of Fig. 2.
Figure 5:
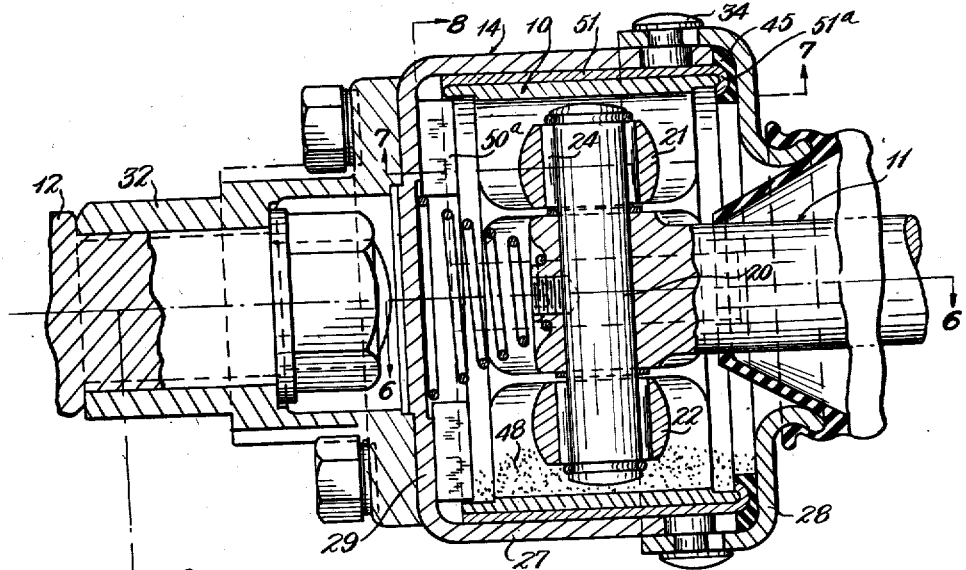
Fig. 5 is a partial longitudinal sectional view taken through a modified form of my universal joint.
Figure 6:
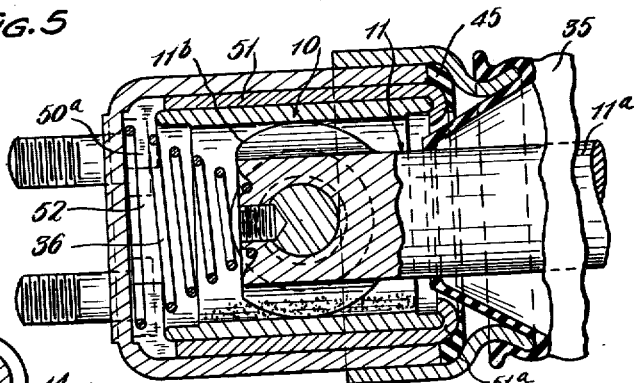
Fig. 6 is a partial longitudinal sectional view taken through the modified joint on line 6—6 of Fig. 5.
Figure 8:
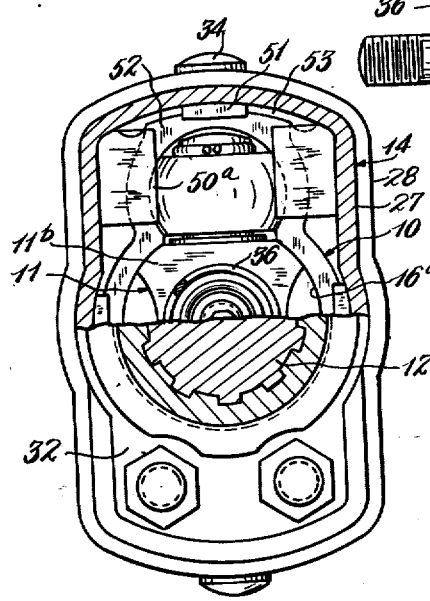
Fig. 8 is a transverse sectional view taken on line 8—8 of Fig. 5.
Figure 7:
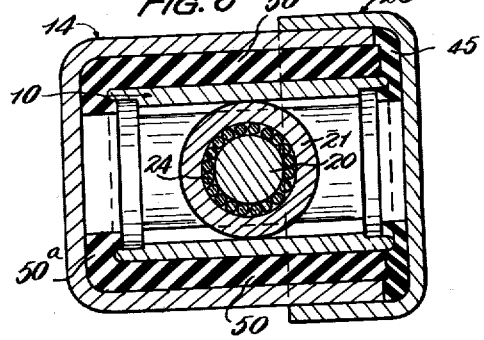
Fig. 7 is another partial longitudinal sectional view taken on line 7—7 of Fig. 5.

In the form of my universal joint illustrated in Figs. 1 to 4, inclusive, I show a pair of joint members 10 and 11 which cooperate with each other so as to permit swiveling or universal movement therebetween and are used to connect a pair of torque-transmitting shafts 12 and 13. My improved universal joint may be used to transmit torque or driving force for various purposes but is especially suitable for use in the propulsion of motor vehicles. When the joint is applied to this particular use, the torque-transmitting shaft 12 represents the stub shaft projecting from the transmission housing and the shaft 13 represents the propeller shaft extending to the axle housing. As shown in Fig. 1, the joint member 11 may be connected directly to the propeller shaft 13. The joint member 10 is not connected directly to the shaft 12, but is contained in an outer housing 14 which is in turn connected to the shaft 12. As will be explained presently, the joint member 10 is supported in the outer housing 14 so as to be capable of limited relative rocking movement which is cushioned or controlled by a resilient medium for the purpose of eliminating shocks and vibrations from the torque being transmitted.

The joint member 10 is in the form of a hollow unitary casing into which one end of the joint member 11 extends. This hollow casing is elongated transversely of the axis of rotation of the universal joint and may be of generally quadrangular cross-sectional shape having axially extending substantially cylindrical passages or guideways therein. These guideways include a central or intermediate guideway 16 and outer guideways 17 and 18 disposed on opposite sides of, and communicating with, such central or intermediate guideway, and these guideways collectively form a non-circular opening which is correspondingly elongated transversely of the axis of rotation of the universal joint. The walls or segments of the intermediate guideway 16 form a pair of opposed cylindrical or arcuate bearing surfaces 16a and the walls of the guideways 17 and 18 form cylindrical bearing surfaces 17a and 18a. To facilitate the machining and other operations used in forming the bearing surfaces in the hollow joint member 10, this member may be left open at both ends thereof, as shown in the drawings.

The joint member 11 may comprise a stem or rod portion 11a which extends into the intermediate axially extending guideway 16 of the hollow joint member 10 and is provided at its inner end with a ball-like head portion 11b which is rockable and slidable in the cylindrical bearing surfaces 16a. This head portion 11b, operating in the cylindrical bearing surfaces 16a, serves to hold the inner end of the joint member 11 centered with respect to the rotation axis 19. The joint member 11 also includes a transverse pin 20 and a pair of ball elements or rollers 21 and 22 mounted on such pin.

The pin 20 extends transversely through the head portion 11b and may be retained therein by means of the set screw 23. Opposite ends of the pin 20 project into the axial guideways 17 and 18, and the ball elements 21 and 22 mounted on these projecting portions of the pin are rockable and slidable in the cylindrical bearing surfaces 17a and 18a. The ball elements 21 and 22 may be rotatably mounted on the pin 20 by means of suitable bushings or sleeves of needle rollers 24. The needle rollers 24 may be held against outward movement by snap rings 25 and inward movement of the needle rollers may be prevented by means of washers 26 surrounding the pin 20 between the ball elements 21 and 22 and the head portion 11b.

The transverse pin 20 and the ball elements 21 and 22 cause the hollow joint member 10 and the joint member 11 to rotate together for the transmission of torque. The ability of the head portion 11b and the ball elements 21 and 22 to rock and slide in the bearing surfaces of the hollow joint member 10 enables the shaft 13 to assume various positions of angularity with respect to the rotation axis 19 while torque is being transmitted, and the ability of the joint member 11 to slide in the hollow joint member 10 eliminates the need for a slip-spline connection with either of the torque-transmitting shafts 12 or 13.

The outer housing 14 is also of substantially quadrangular cross-sectional shape so as to rotate with the hollow joint member 10 which it surrounds. This outer housing may comprise a cup section 27 and a cover section 28. The cup section 27 has a transverse end wall 29 with which the yoke 30 may be connected by suitable bolts 31. The yoke 30 has an internally splined sleeve portion 32 into which the splined end of the shaft 12 extends and is retained by the nut 33.

The cover section 28 may be connected with the cup section 27 of the outer housing in any suitable way, and in this instance, telescopes over the cup section and is retained thereon by means of the locking rivets 34. The transverse wall of the cover section 28 is provided with an opening 28a through which the stem 11a of the joint member 11 extends. The opening 28a may be surrounded by a flared or bell-shaped flange 28b to which a sealing sleeve 35 surrounding the stem 11a may be connected. The sleeve 35 may be a corrugated member molded from rubber or other resilient material. The inner end of the sleeve 35 may be connected with the flange 28b by the resilient gripping action of the annular sleeve portion 35a. The outer end of the sleeve has a reduced portion 35b which surrounds and resiliently grips the stem 11a. The inner end of the sleeve is also provided with a tapered or frusto-conical portion 35c which extends into the opening 28a and grips the stem 11a. The sleeve 35 is sufficiently flexible and resilient to permit angularity of the shaft 13 and grips the stem 11a and the flange 28b tightly enough to maintain the outer housing 14 sealed against the loss of lubricant or the entry of water, dust, or other foreign matter.

Lost motion occurring in an axial direction between the joint members 10 and 11 may be taken up by means of a conical and helical compression spring 36 disposed between the head portion 11b and the end wall 29 of the cup section 27. The inner end of the head portion 11b may be provided with an annular recess 37 surrounding the set screw 23 which receives and centers the small end of the spring 36.

An important feature of my universal joint is its ability to absorb or dampen vibrations and shocks, as mentioned above in a general way, and for this purpose I support the hollow joint member 10 in the outer housing 14 so as to permit a controlled or cushioned rocking of the hollow joint member therein. The joint member 10 may be supported in the outer housing 14 and centered with respect to the rotation axis 19 by bearing means, which, in this instance, is in the form of a plurality of axial bearing strips 38 disposed between such joint member and the wall of the outer housing. Although any desired number of the bearing strips 38 could be provided, I employ four such bearing elements in this instance and arrange them substantially 90° apart. These bearing strips may be connected either with the outer housing or with the hollow joint member 10, preferably with the latter as shown in this instance, wherein these strips are set into grooves or recesses 38a provided in the joint member 10 and have sliding engagement with the curved bearing surfaces 40 and 41 of the outer housing. These curved bearing surfaces are made substantially concentric with the rotation axis 19 so that the hollow joint member 10 will always be centered with respect to the rotation axis.

For resisting or controlling the relative rocking of the hollow joint member 10 in the outer housing 14, I employ a cushioning medium preferably in the form of resilient rubber. This cushioning rubber may be in the form of strip-like bodies 42 disposed between the hollow joint member and the outer housing. In this instance, I employ four of the strip-like rubber bodies 42 and arrange them in pairs on opposite sides of the reduced portions of the joint member in which the guideways 17 and 18 are formed. The strip-like rubber bodies 42 are preferably assembled in the joint structure so that they will be under initial compression. This may be done by making them somewhat thicker than the space available between the hollow joint member and outer housing, and then forcing or drawing them into the outer housing at the same time that the hollow joint member is moved thereinto.

Figure 2:
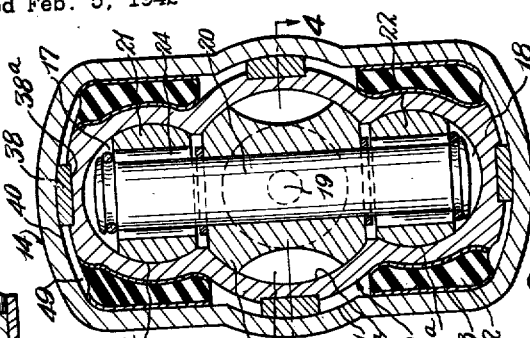
Fig. 2 is a transverse sectional view taken through the joint on line 2—2 of Fig. 1.
Figure 3:
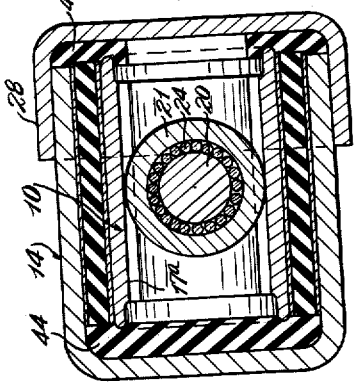
Fig. 3 is a partial longitudinal sectional view taken through the joint on line 3—3 of Fig. 1.

One or both side faces of the strip-like rubber bodies 42 may be provided with a facing in the form of a sheet 43 of relatively thin, flexible metal which may be bonded or otherwise united to the rubber. Both the rubber of the strip-like bodies 42 and the metal facing 43 conform to the shape or curvature of the hollow joint member and outer housing, as shown in Fig. 2, so that there will be no space or looseness between the cushioning elements 42 and the confining portions of the hollow joint member and outer housing.

The hollow joint member 10 is held against any substantial axial movement in the outer housing 14 by means of ring-like rubber bodies 44 and 45 which also serve as gaskets for the ends of the hollow joint member. The rubber bodies or gaskets 44 and 45 also serve to hold the bearing elements 38 against axial shifting in the grooves 38a. Additionally, the rubber bodies or gaskets 44 and 45 assist the locking rivets 34 in retaining the cover section 28 of the outer housing on the cup section 27. When this cover section is placed on the cup section 27, sufficient axial pressure is applied to compress the gaskets 44 and 45 and bring the openings 46 of the cover section into register with the openings 47 of the cup section. When these openings are in register, the heads 34a of the rivets 34 can be inserted, whereupon the axial pressure is released and a portion of the cover section moves outwardly into overlying relation to the inner heads 34a, thus retaining the rivets in place while the rivets in turn lock the cover against being accidentally disconnected from the cup section 27.

For lubricating the bearing surfaces and moving parts of my improved universal joint, I may place a quantity of suitable lubricant in the hollow joint member 10. This lubricant may be oil or any other suitable lubricating material, but I prefer to use a quantity of loose, dry powder 48, such as calcium stearate or graphite. This powder forms a lubricating film on the bearing surfaces and moving parts, which film is resistant to wear and contributes to the long life of the universal joint. Such loose, dry powder is continually agitated during the use of the universal joint and is more easily and satisfactorily retained in the structure by the sealing sleeve 35 and the gaskets 44 and 45 than would be the case with lubricants in the forms of oils or greases. Another important advantage for this lubricating powder is that its lubricating qualities are substantially unaffected by temperature changes. If desired, some of the lubricating powder 48 may also be placed in the spaces 49 between the hollow joint member 10 and the outer housing 14 for the purpose of lubricating the bearing strips 38 and the surfaces 40 and 41 with which they cooperate.

In Figs. 5 to 8, inclusive, I show a modified form of my universal joint in which the joint members 10 and 11 and the outer housing 14 have the same construction and general arrangement as in the universal joint shown in Fig. 1 and described above. In the modified form of my universal joint, however, the metal facing or facings have been omitted from the strip-like rubber bodies 50 which form the cushioning medium between the hollow joint member 10 and the outer housing.

Another variation in the modified universal joint is that the gasket-like body 44 of Fig. 1 has been omitted and the axially extending cushioning strips 50 have been provided with angular extensions 50a which extend between the end wall 29 of the cup section 27 and the adjacent end of the hollow joint member 10. The bearing strips 51 also differ from the bearing strips 38 of Fig. 1 in that the strips 51 have hook portions 51a which extend around one end of the hollow joint member 10 to prevent these bearing strips from shifting axially toward the end wall 29 of the cup section 27. Shifting of these strips in the opposite direction is prevented by the rubber body or gasket 45.

Since there are four of the cushioning rubber strips 50 disposed between the hollow joint member 10 and outer housing 14 at 90° intervals, the extensions 50a will not form a continuous gasket around this end of the hollow joint member, but intervening openings 52 will occur between the extension portions 50a, and these openings will provide communication between the interior of the hollow joint member 10 and the outer spaces 53. These communicating openings will permit lubricant such as the dry, loose powder 48 to reach and lubricate the bearing strips 51 and the bearing surfaces with which they cooperate.

In all other respects, the universal joint shown in Figs. 5 to 8, inclusive, is substantially identical with the universal joint shown in Figs. 1 to 4, inclusive.

From the foregoing description and the accompanying drawings, it will now be readily seen that I have provided an improved universal joint structure in which the joint member 11 is rockable and slidable in the hollow joint member 10 so as to permit angularity of the shaft 13 without requiring the use of a slip-spline connection for either of the torque-transmitting shafts. It will also be seen that the joint member 11 is centered in the hollow joint member 10 by the cooperation of the head portion 11b with the cylindrical bearing surfaces 16a, and the hollow joint member 10 is rockably centered in the outer housing 14 by the bearing elements 38 and 51. The joint members are thus centered with respect to the rotation axis 19 so that the tendency to produce vibration will be minimized. Additionally, it will be seen that the cushioning rubber bodies 42 and 50 are embodied in the universal joint itself and will yieldingly oppose the relative rocking of the hollow joint member 10 and will absorb shocks and hammer-like blows, as well as vibrations and noises. The absorption of these undesirable factors by the cushioning bodies will prevent the rollers or ball elements from peening or otherwise damaging the bearing surfaces and will also prevent these factors from being transmitted with the torque to mechanisms where they might produce harmful results. It is important to note also that the cushioning rubber is subjected only to compression and is never subjected to twisting or stretching. Furthermore, it will be seen that my improved universal joint provides a construction which can be easily assembled and serviced and in which the use of a loose, dry powder as lubricant will enable the joint to render satisfactory service throughout a prolonged period.

At certain points I have referred to the use of rubber as the cushioning medium and as the material from which the gaskets and sealing sleeve are formed. I desire it to be understood, however, that the word "rubber" as used herein is intended to include natural rubber, synthetic rubber which is resistant to the deteriorating action of lubricants, and all other appropriate rubber-like substances or rubber substitutes.

While I have illustrated and described my improved universal joint construction in a more or less detailed manner, it will be understood, of course, that I do not wish to be limited to the specific details and features herein disclosed, but regard my invention as including such changes and modifications as come within the scope of the appended claims.

Having thus described my invention, I claim:

1. A universal joint comprising, a unitary hollow joint member elongated in a direction transversely of the axis of rotation of the joint and having bearing surfaces therein defining a correspondingly elongated opening, a second joint member adapted for connection with a rotatable member and having means extending into said opening and forming with said hollow joint member a flexible torque-transmitting connection, said means being both rockable and axially slidable in the bearing surfaces defining said opening, an outer housing adapted for connection with a second rotatable member and having therein an opening elongated transversely of said axis of rotation and in which said hollow joint member is disposed, and resilient vibration-absorbing rubber located between said outer housing and hollow joint member at points offset from said axis of rotation and permitting limited relative rocking of the hollow joint member in said outer housing, said rubber being subjected to compression, as distinguished from shear or tension, between said hollow joint member and outer housing during the transmission of torque through the universal joint.

2. In a universal joint structure embodying a hollow joint member into which a second joint member extends, said hollow joint member having longitudinally coextending spaced cylindrical bearing surfaces therein and said second joint member being both rockable and longitudinally slidable in said cylindrical bearing surfaces, an outer housing disposed around said hollow joint member and adapted for connection with a torque-transmitting member, means centering said hollow joint member in said outer housing and permitting rocking of said hollow joint member relative to said outer housing, and vibration-absorbing resilient rubber disposed between said hollow joint member and outer housing.

3. In a universal joint, a hollow unitary joint member having bearing surfaces therein, a second joint member extending into said hollow member and having means in rockable and longitudinally slidable engagement with said bearing surfaces so as to provide an extensible torque-transmitting swivel connection, said second joint member being adapted for connection with one of a pair of torque-transmitting shafts, an outer housing disposed around said hollow joint member and adapted for connection with the other of said pair of shafts, bearing means supporting said hollow joint member in said outer housing so as to permit relative rocking therebetween, and resilient rubber between said hollow joint member and outer housing for cushioning said relative rocking.

4. A universal joint comprising, a unitary hollow joint member elongated in a direction transversely of the axis of rotation of the joint and having bearing surfaces therein defining a correspondingly elongated opening, a second joint member adapted for connection with a rotatable member and having means extending into said opening and forming with said hollow joint member a flexible torque-transmitting connection, said means being both rockable and axially slidable in the bearing surfaces defining said opening, an outer housing adapted for connection with a second rotatable member and having therein an opening elongated transversely of said axis of rotation and in which said hollow joint member is disposed, resilient vibration-absorbing rubber located between said outer housing and hollow joint member at points offset from said axis of rotation and permitting limited relative rocking of the hollow joint member in said outer housing, said rubber being subjected to compression, as distinguished from shear or tension, between said hollow joint member and outer housing during the transmission of torque through the universal joint, a quantity of dry lubricating powder loose in said hollow joint member for lubricating said bearing surfaces and the lubricating qualities of which powder are substantially unaffected by temperature changes, and means for retaining said powder in said hollow joint member.

5. In a universal joint, a hollow joint member having longitudinally extending bearing surfaces therein, a second joint member extending into said hollow joint member and having means in rockable and longitudinally slidable engagement with said bearing surfaces so as to provide an extensible torque-transmitting swivel connection, said second joint member being adapted for connection with one of a pair of torque-transmitting shafts, an outer housing disposed around said hollow joint member and adapted for connection with the other of said torque-transmitting shafts, said hollow joint member being rockable in said outer housing, resilient rubber disposed between said hollow joint member and outer housing for cushioning such rocking, a quantity of dry lubricating powder loose in said hollow joint member, and means for retaining said powder in said hollow joint member.

6. In a universal joint, a hollow joint member having longitudinally extending bearing surfaces therein, a second joint member extending into said hollow joint member and having means in rockable and longitudinally slidable engagement with said bearing surfaces so as to provide an extensible torque-transmitting swivel connection, said second joint member being adapted for connection with one of a pair of torque-transmitting shafts, an outer housing disposed around said hollow joint member and adapted for connection with the other of said torque-transmitting shafts, bearing means supporting said hollow joint member in said outer housing so as to permit relative rocking therebetween, resilient rubber disposed between said hollow joint member and outer housing for cushioning said relative rocking, a quantity of dry lubricating powder loose in said hollow joint member and outer housing, and means sealing said outer housing against loss of said powder.

7. In a universal joint, a hollow joint member open at its ends and having longitudinally coextending spaced cylindrical bearing surfaces therein, a second joint member extending into said hollow joint member and having portion rockable and longitudinally slidable in said cylindrical bearing surfaces, said second joint member being adapted for connection with one of a pair of torque-transmitting shafts, an outer housing comprising a cup section disposed around said hollow joint member and a cover section, said cup section having its end wall adapted for connection with the outer of said torque-transmitting shafts, said cover section being connected with said cup section and having an opening through which said second joint member extends, bearing means supporting said hollow joint member for relative rocking in said outer housing, and resilient rubber disposed between said outer housing and the ends and sides of said hollow joint member.

8. In a universal joint, a hollow joint member having a longitudinal central cylindrical bearing portion and outer longitudinal cylindrical bearing portions on opposite sides of, and communicating with, said central cylindrical bearing portion, a second joint member having a centering ball portion rockable and longitudinally slidable in said central cylindrical bearing portion and other portions rockable and longitudinally slidable in said outer cylindrical bearing portions, said second joint member being adapted for connection with one of a pair of torque-transmitting shafts, an outer housing disposed around said hollow joint member and adapted for connection with the other of said shafts, bearing means supporting and centering said hollow joint member in said outer housing and permitting relative rocking of the hollow joint member therein, and resilient rubber providing a cushioning means between said hollow joint member and outer housing.

9. In a universal joint of the character described, a hollow joint member having longitudinal bearing surfaces therein, a second joint member extending into said hollow joint member and having means in rockable and longitudinally slidable engagement with said bearing surfaces so as to provide an extensible torque-transmitting swivel connection, said second joint member being adapted for connection with one of a pair of torque-transmitting shafts, an outer housing disposed around said hollow joint member and adapted for connection with the other of said shafts, a plurality of spaced pairs of cooperating arcuate bearing surfaces rockably mounting said hollow joint member in said outer housing, said arcuate bearing surfaces being substantially concentric with the common axis of said hollow joint member and outer housing and one bearing surface of each of said pairs being formed by a bearing strip extending axially between said hollow joint member and outer housing, and resilient rubber providing a cushioning means between said hollow joint member and said outer housing.

10. In a universal joint of the character described, a hollow joint member having longitudinally extending spaced bearing surfaces therein, a second joint member extending into said hollow joint member and having means in rockable and longitudinally slidable engagement with said bearing surfaces so as to provide an extensible torque-transmitting swivel connection, said second joint member being adapted for connection with one of a pair of torque-transmitting shafts, an outer housing disposed around said hollow joint member and adapted for connection with the other of said shafts, a plurality of spaced pairs of cooperating arcuate bearing surfaces rockably mounting said hollow joint member in said outer housing, said arcuate bearing surfaces being substantially concentric with the common axis of said hollow joint member and outer housing, and resilient rubber disposed between said hollow joint member and outer housing for cushioning the relative rocking therebetween.

11. In a universal joint of the character described, a hollow joint member having bearing surfaces therein, a second joint member extending into said hollow joint member and having means cooperating with said bearing surfaces so as to provide a torque-transmitting swivel connection, said second joint member being adapted for connection with one of a pair of torque-transmitting shafts, an outer housing disposed around said hollow joint member and adapted for connection with the other of said shafts, and a plurality of spaced strip-like bodies of resilient rubber extending between said hollow joint member and outer housing, said bodies having a facing of relatively thin flexible metal united thereto.

12. In a universal joint of the character described, a hollow joint member having bearing surfaces therein, said hollow joint member being of generally quadrangular cross-sectional shape and having an axially extending intermediate body portion and relatively reduced axially extending portions projecting from said body portion, a second joint member extending into said hollow joint member and having means in rockable and axially slidable engagement with said bearing surfaces so as to provide an extensible torque-transmitting swivel connection, said second joint member being adapted for connection with one of a pair of torque-transmitting shafts, an outer housing of substantially quadrangular cross-sectional shape disposed around said hollow joint member and adapted for connection with the other of said shafts, bearing means supporting said hollow joint member in said outer housing for relative rocking about their common axis, and axially extending bodies of resilient rubber disposed between said outer housing and said relatively reduced portions of the hollow joint member.

JACOB RUSH SNYDER.